UNITED STATES PATENT OFFICE.

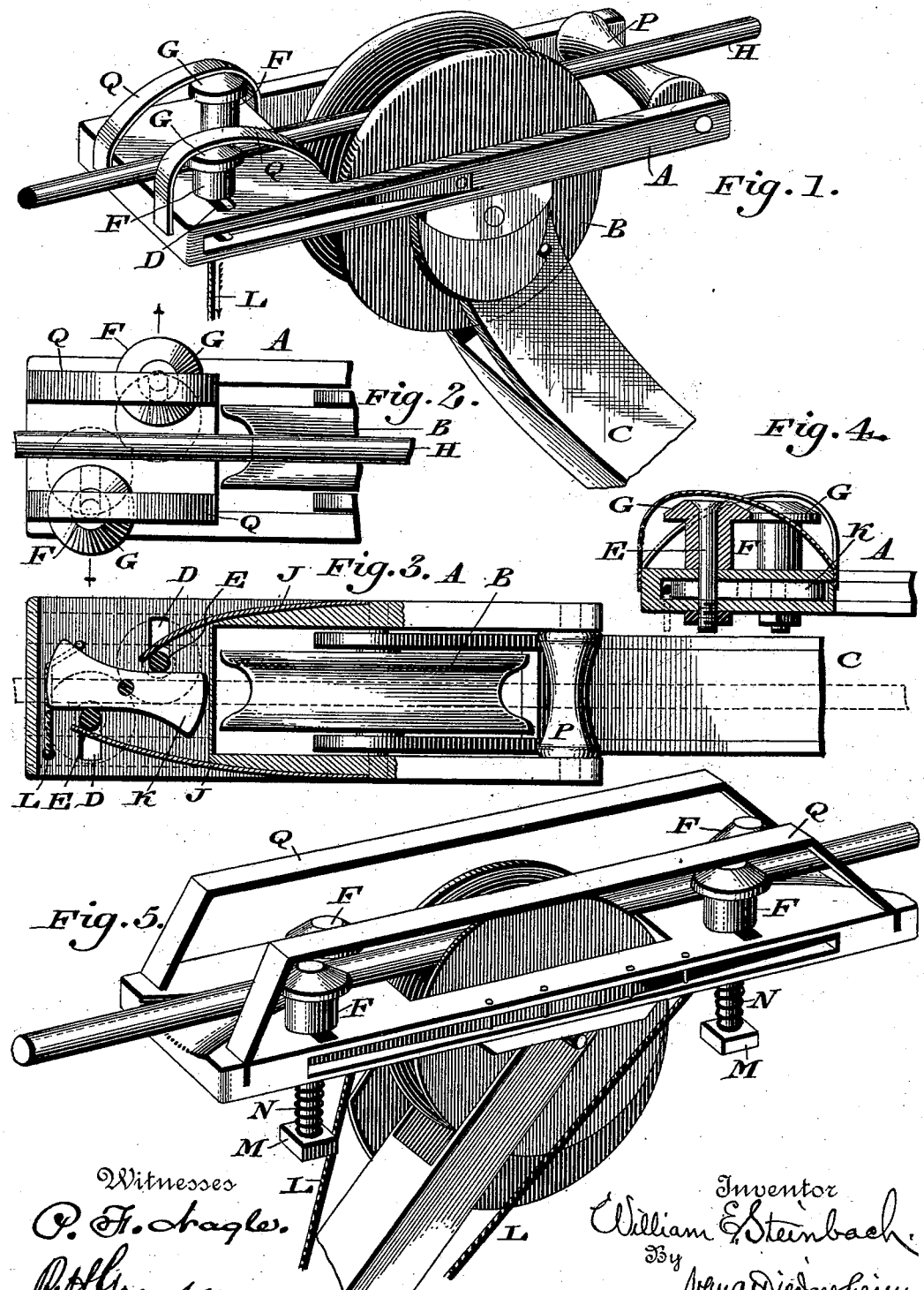
(No Model.)
W. E. STEINBACH.
TROLLEY.
No. 540,883. Patented June 11, 1895.

WILLIAM E. STEINBACH, OF PHILADELPHIA, PENNSYLVANIA.

TROLLEY.

SPECIFICATION forming part of Letters Patent No. 540,883, dated June 11, 1895.

Application filed April 6, 1895. Serial No. 544,698. (No model.)

*To all whom it may concern:*

Be it known that I, WILLIAM E. STEINBACH, a citizen of the United States, residing in the city and county of Philadelphia, State of Pennsylvania, have invented a new and useful Improvement in Trolleys, which improvement is fully set forth in the following specification and accompanying drawings.

My invention consists in providing a trolley with auxiliary rollers, which serve to prevent the trolley from jumping the wire, or improper disconnection therefrom, and with means for opening or separating said rollers, in such manner that the trolley may be removed from the wire when so desired.

Figure 1 represents a perspective view of a trolley embodying my invention. Fig. 2 represents a top or plan view of a portion thereof. Fig. 3 represents a horizontal section thereof. Fig. 4 represents a vertical section of a portion thereof. Fig. 5 represents a perspective view of another form of the invention.

Similar letters of reference indicate corresponding parts in the several figures.

Referring to the drawings, A designates the frame of a trolley, on which is mounted the trolley roller B, and with which is connected the arm C, in general respects as usual in such cases. In the frame are transversely-extending slots D, in which are freely fitted the shafts E of the rollers F, it being noticed that said shafts extend in vertical direction, the upper portions of the peripheries of said rollers having flanges G thereon, thus in a measure grooving said rollers, it being noticed that the wire H is between said rollers and below said flanges, whereby the rollers are prevented from disengagement from the wire in downward or lateral directions, while the frame and roller B limit the upward motion of the trolley, it being evident that the trolley is prevented from jumping or disconnection from the wire. In order to hold the rollers F in closed condition, or toward each other, I employ the springs J, which are connected at one end with the frame A, and bear at the other end on the shafts E of said rollers, as most plainly shown in Fig. 3. In order to open or separate the rollers F, I employ the crank arm K, which is pivotally mounted on the frame A, and located between the shafts E, so that when said arm is rotated, it bears against said shafts and separates the same, as shown in Fig. 2, whereby the flanges G are so far removed from each other, that they do not present any obstacle to the lowering of the trolley, see Fig. 2, it being evident that the trolley may then be disengaged from the wire.

Connected with one end or limb of the arm K, is a chain or cord L, which passes through an opening in the frame A, and extends to the car, whereby the conductor or motorman may operate the same in order to rotate the arm K, and thus separate the rollers F, it being evident that when said cord is let-go, the springs J which operate in recesses in the sides of said frame A exert their pressure on said rollers, and thus close the same.

In order to permit the rollers to yield in vertical directions, and thus prevent injury to the same when the trolley is subjected to downward strain, there are interposed between the frame and the nuts M of the shafts E, the springs N, the same contracting when the nuts are raised with the shafts, the effect of which is evident.

In Figs. 1, 2, 3 and 4, I show the frame as provided with the rollers F at one end thereof, and a horizontal guide roller P at the other end thereof, while in Fig. 5, the frame is provided with such rollers F at both ends thereof, both ends being provided with cords L for separating the respective rollers.

Secured to the frame A, and located over the rollers F are guards Q, for preventing the rollers from being struck while the trolley passes through switches.

Having thus described my invention, what I claim as new, and desire to secure by Letters Patent, is—

1. A trolley formed with auxiliary rollers which are adapted to engage with the trolley wire, and a crank arm for separating said rollers to permit the same to be disconnected from said wire, substantially as described.

2. A trolley provided with auxiliary rollers, slots in the frame receiving the shafts of said rollers, and springs and crank arms adapted to bear against shafts in opposite directions whereby the rollers may be made to advance or recede to and from each other, substantially as described.

3. A trolley having auxiliary rollers, shafts carrying said rollers mounted in slots on the frame thereof, and a crank arm on the frame adapted to bear against said shafts in order to separate said rollers, and means for operating said arm, substantially as described.

4. A trolley having transversely-extending slots in the frame thereof, rollers adapted to engage the trolley wire, and sliding shafts carrying said rollers mounted in said slots, and a movable arm adapted to bear against said shafts for separating the rollers, the parts named being combined substantially as described.

5. In a trolley, a frame with the trolley roller thereon, supplemental rollers on said frame adapted to engage the trolley wire, the shafts of said rollers being laterally and vertically movable in slots in the frame, and crank arms for operating said shafts substantially as described.

6. A trolley having a frame A, with the transverse slots D therein, the shafts E in said slots carrying the rollers F with flanged heads and the springs J secured to said frame and in recesses in the sides thereof, said parts being combined substantially as described.

7. A trolley having a frame A, the roller B journaled therein, the auxiliary rollers F with flanged heads journaled in transverse slots in said frame and the guards Q, said parts being combined substantially as described.

8. A trolley having a frame with a roller B therein, the spring controlled auxiliary rollers F, the crank arm for separating said rollers, and springs on the journals of said auxiliary rollers bearing against nuts thereon and said frame, said parts being combined substantially as described.

WILLIAM E. STEINBACH.

Witnesses:
JOHN A. WIEDERSHEIM,
R. H. GRAESER.